(12) United States Patent
Vogelaar (10) Patent No.: US 11,253,892 B2
(45) Date of Patent: Feb. 22, 2022

(54) SUCTION HEAD FOR A WASTE SORTING SYSTEM

(71) Applicant: Bollegraaf Patents and Brands B.V., Appingedam (NL)

(72) Inventor: Johannes Sijbrand Vogelaar, Appingedam (NL)

(73) Assignee: Bollegraaf Patents and Brands B.V., Appingedam (NL)

( * ) Notice: Subject to any disclaimer, the term of this patent is extended or adjusted under 35 U.S.C. 154(b) by 98 days.

(21) Appl. No.: 16/720,023

(22) Filed: Dec. 19, 2019

(65) Prior Publication Data

US 2020/0206782 A1 Jul. 2, 2020

(30) Foreign Application Priority Data

Dec. 28, 2018 (NL) ........................... 2022320

(51) Int. Cl.
*B07C 5/36* (2006.01)
(52) U.S. Cl.
CPC .................... *B07C 5/363* (2013.01)
(58) Field of Classification Search
CPC ........................................ B07C 5/363
USPC .......................................... 209/643
See application file for complete search history.

(56) References Cited

U.S. PATENT DOCUMENTS

| | | | |
|---|---|---|---|
| 3,910,620 A | 10/1975 | Sperry | |
| 4,582,353 A * | 4/1986 | Alvernhe | B25J 15/0616 294/189 |
| 10,913,165 B1 * | 2/2021 | Jonas | B25J 15/0683 |
| 2007/0200377 A1 * | 8/2007 | Nishio | B25B 11/005 294/188 |
| 2013/0147101 A1 * | 6/2013 | Cho | B65G 47/91 269/21 |
| 2016/0257475 A1 * | 9/2016 | Gervais | B65D 43/0214 |
| 2018/0168915 A1 * | 6/2018 | Gwen | A61M 1/815 |
| 2019/0084012 A1 * | 3/2019 | McCoy, Jr | B07C 5/3422 |
| 2019/0262031 A1 * | 8/2019 | Efremkin | A61B 17/320725 |

FOREIGN PATENT DOCUMENTS

| | | | |
|---|---|---|---|
| EP | 0706838 A1 | | 4/1996 |
| JP | S59190511 A | | 10/1984 |
| KR | 20090003739 U | * | 4/2009 |
| KR | 20090003739 U | | 4/2009 |

* cited by examiner

*Primary Examiner* — Terrell H Matthews
(74) *Attorney, Agent, or Firm* — N.V. Nederlandsch Octrooibureau; Catherine A. Shultz; Katelyn J. Bernier (57) ABSTRACT

A suction head (1) for a waste sorting system includes a main tubular body (2) having a connecting end (3) for connection to a suction system (S) and a suction end (4) for engagement with a waste item. An upper sleeve member (5) and a lower sleeve member (6) are arranged around the suction end (4), wherein the upper sleeve member (5) is longitudinally movable with respect to the main tubular body (2) and the lower sleeve member 6 is removable from the suction end (4). An annular gripper sheet (7) of flexible material is arranged between the upper and lower sleeve member (5, 6). A biasing member (8) is in longitudinal biasing engagement with the upper sleeve member (5) for biasing the upper sleeve member (5) toward the lower sleeve member (6), clamping the annular gripper sheet (7) between the upper and lower sleeve member (5, 6).

16 Claims, 3 Drawing Sheets

SUCTION HEAD FOR A WASTE SORTING SYSTEM

FIELD OF THE INVENTION

The present invention relates to a suction head, in particular a suction head or gripper for a waste sorting/processing system, such as a robotic waste sorting/processing system.

BACKGROUND ART

European patent application EP0706838A1 discloses a machine and method for fully automated sorting of various heterogeneous objects with at least one robotic arm. The machine utilises a robotic arm with a gripper formed by a pneumatic device operated by suction to grip an object and by blowing to release the object.

SUMMARY OF THE INVENTION

The present invention seeks to provide an improved suction head or gripper for waste sorting systems, wherein the suction head provides reliable and robust suction based gripping of waste items to be removed from a waste stream. The suction head further provides improved conformal engagement with waste items to increase the variety of waste items that can be gripped. Furthermore, the suction head is designed to greatly simplify the assembly and disassembly of the suction head to improve serviceability thereof.

According to the present invention, the suction head comprises a main tubular body having a connecting end for connection to a suction system and a suction end for engagement with a waste item;

an upper sleeve member and a lower sleeve member arranged around the suction end, wherein the upper sleeve member is longitudinally movable with respect to the main tubular body and wherein the lower sleeve member is removable from the suction end. An annular gripper sheet of flexible material is arranged between the upper and lower sleeve member. The suction head further comprises a biasing member in longitudinal biasing engagement with the upper sleeve member for biasing the upper sleeve member toward the lower sleeve member, clamping the annular gripper sheet between the upper and lower sleeve member.

According to the present invention, the clamped arrangement of the movable upper sleeve member, the removable lower sleeve member and the annular gripper sheet clamped there between provides for an extremely simple to assemble and dissemble suction head. For example, replacing the annular gripper sheet is readily achieved by moving the upper sleeve member in upward fashion against a biasing force imposed by the biasing member. Doing so loosens the annular gripper sheet and allows the lower sleeve member to be removed followed by the removal of the annular gripper sheet. The assembly process of the suction head is simply the reverse, i.e. moving the upper sleeve member in upward direction against the biasing member, placing the annular gripper sheet followed by attaching the lower sleeve member to the suction end. Letting go of the upper sleeve member will then allow the biasing member to move, in downward fashion, the upper sleeve member toward the lower sleeve member as a result of which the annular gripper sheet is firmly clamped there between.

Furthermore, another advantage of the suction head is that the above exemplified assembly and disassembly process can be performed manually without tools and without having to loosen or tighten bolts, nuts, or having to deal with any other conventional fasteners, clip rings, washers etc. So in case the suction head is e.g. clogged with a waste item and/or the annular gripper sheet requires repair or replacement, then servicing the suction head can be performed very quickly and in manual fashion. This ensures that a waste sorting and/or processing system is productive with minimal interruption and downtime.

In an advantageous embodiment, the annular gripper sheet comprises elastomeric material, e.g. rubber, silicone, EPDM or a combination thereof, thereby providing durability and flexibility to the annular gripper sheet.

In embodiment, the lower sleeve member comprises a circumferential upward facing bevelled edge for clamping engagement with the annular gripper sheet, allowing the annular gripper sheet to attain a substantially conic shape such that a circumferential edge of the annular gripper sheet has a much higher chance of properly and adequately engaging a waste item with minimum air leakage during strong suction.

In an advantageous embodiment, the lower sleeve member is formed by two semi-circular sleeve parts/shells, each semi-circular sleeve part comprising a circumferential upward facing bevelled edge portion of the circumferential upward facing bevelled edge. This embodiment simplifies assembly and removability of the lower sleeve member, which is achieved through the two semi-circular sleeve parts or shells each of which wrap in part around the suction end in removable fashion. Each of the semi-circular sleeve parts can be placed and removed in lateral direction with respect to the suction end.

In a further advantageous embodiment, the suction end of the main tubular body comprises an outer surface provided with a circumferential groove, wherein each semi-circular sleeve part mentioned above comprises an inwardly extending circumferential ridge receivable in the groove of the suction end. The groove and the inwardly extending circumferential ridges are so configured to engage and interlock in conformal fashion such that longitudinal movement of each semi-circular sleeve part is prevented.

Note that in a further embodiment, each of the semi-circular sleeve parts comprises a lower sleeve portion comprising the circumferential upward facing bevelled edge portion mentioned earlier and an upper sleeve portion being receivable in the upper sleeve member. The upper sleeve portion of each semi-circular sleeve part/shell can be inserted into the upper sleeve member so that the upper sleeve member encloses and encircles in part the lower sleeve member, encloses and encircles the upper sleeve portions, allowing the upper sleeve member to act as a retainer preventing separation of each of the semi-circular sleeve parts from the suction end.

To ensure that the annular gripper sheet is able to firmly engage the circumferential upward facing bevelled edge, an embodiment is provided wherein the annular gripper sheet comprises an aperture in which the upper sleeve portion of each semi-circular sleeve part is receivable. This embodiment is also advantageous for centering the annular gripper sheet in lateral/sideways fashion with respect to the suction head.

In an exemplary embodiment, the biasing member is a coil or spiral spring member arranged around the main tubular body in longitudinal biasing engagement with the upper sleeve member. Having the coil spring member arranged around the main tubular body prevents buckling of the coil spring member yet enables reliable biasing engagement. In a further embodiment, the coil spring member is in biasing engagement with a circumferential upper edge portion of the upper sleeve member, allowing a circumferentially distributed biasing force to be provided on the upper sleeve member which minimizes tilting/rotation of the upper sleeve member.

In an embodiment, the suction head further comprises a connector sleeve member for connection to a robot manipulator and wherein the connector sleeve member is arranged around the connecting end of the main tubular body and longitudinally moveable with respect thereto. The biasing member is in longitudinal biasing engagement with the connector sleeve member.

In a further embodiment, an inner connector sleeve member comprising an upper inner sleeve portion is receivable in the connector sleeve member and a lower inner sleeve portion provided with a circumferential outward protruding collar for engagement with the biasing member. The inner connecter sleeve member improves longitudinal movement of the connector sleeve member through reduced friction offered by the upper inner sleeve portion whilst the outward protruding collar provides an abutment/contact area for the biasing member.

To provide a removable backstop for the connector sleeve member as the biasing member is in upward biasing engagement with the connector sleeve member, an embodiment is provided wherein a locking sleeve member is arranged around the connecting end of the main tubular body and releasably, e.g., removably, connected to the connecting end. The connector sleeve member is then longitudinally arranged between the upper sleeve member and the locking sleeve member. Note that the removable locking sleeve member further simplifies the assembly and disassembly of the suction head should servicing and/or maintenance be required.

SHORT DESCRIPTION OF DRAWINGS

The present invention will be discussed in more detail below, with reference to the attached drawings, in which.

DETAILED DESCRIPTION OF EMBODIMENTS

Figure 1:
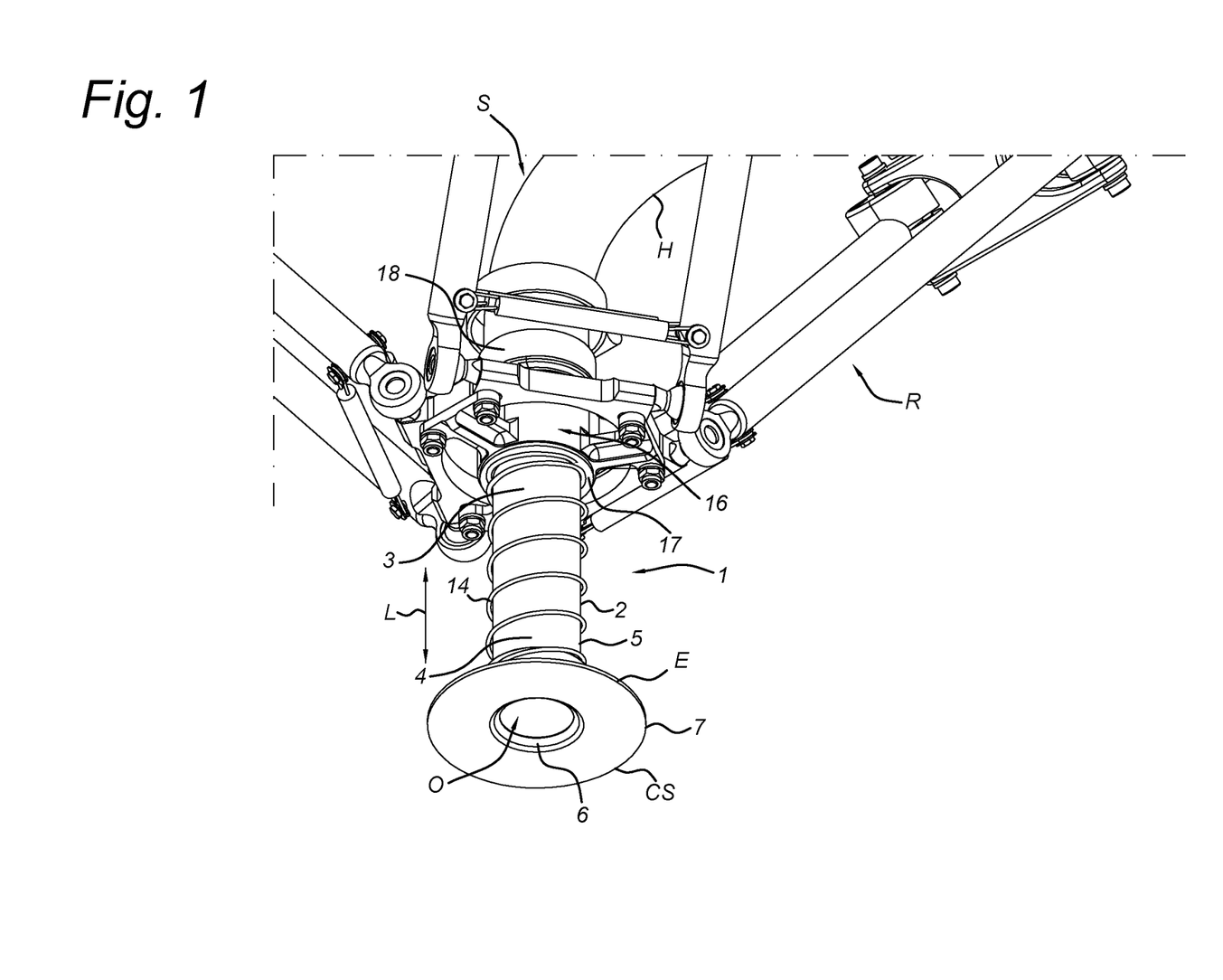
FIG. 1 shows a three dimensional view of a suction head according to an embodiment of the present invention.
Figure 2:
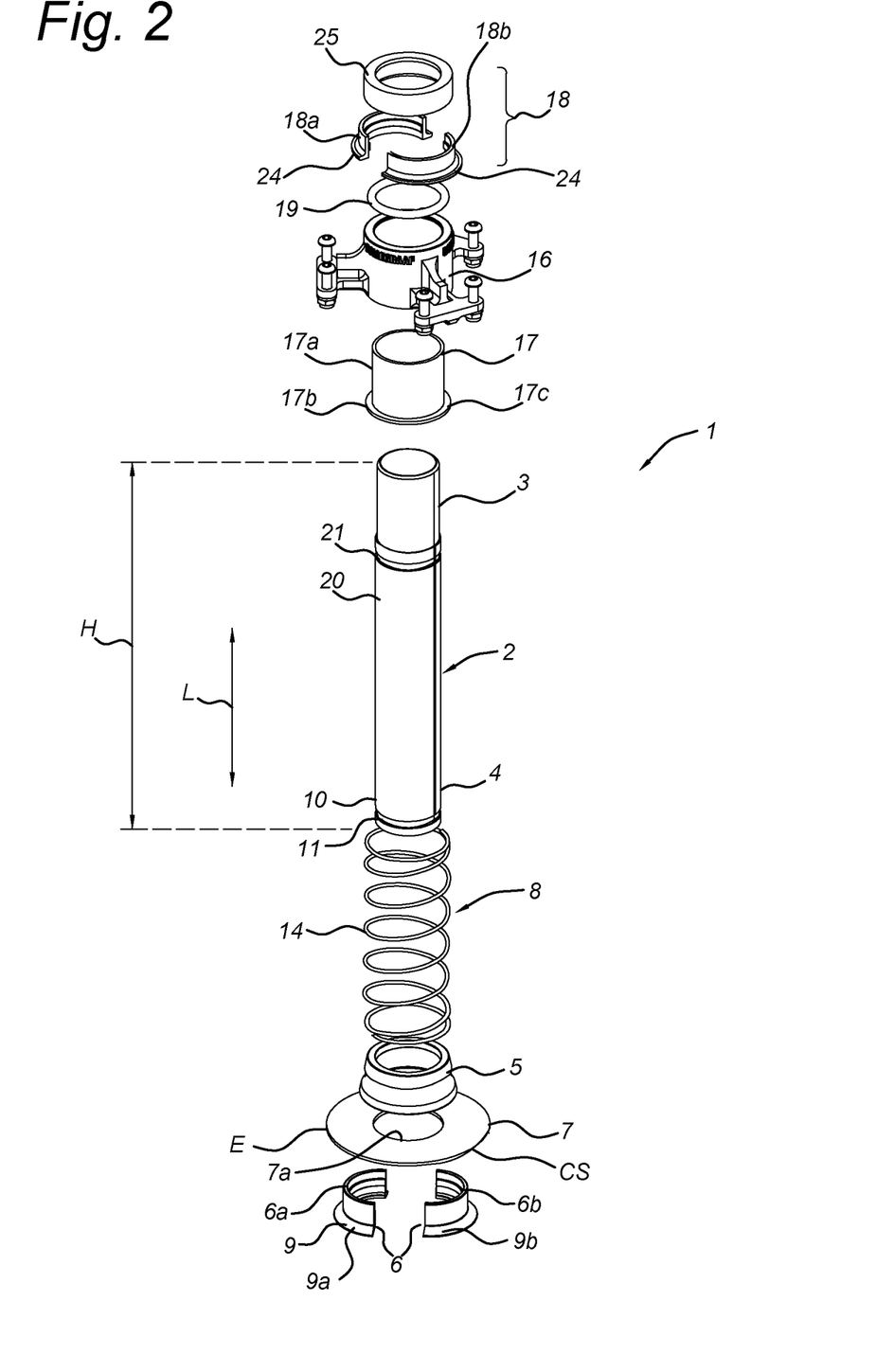
FIG. 2 shows an exploded view of a suction head according to an embodiment of the present invention.

FIGS. 1 and 2 show a three dimensional view and exploded view, respectively, of a suction head 1 according to an embodiment of the present invention. In the embodiments shown, the suction head 1 comprises a main tubular body 2 having a connecting end 3 for connection to a suction system S and a suction end 4 for engagement with a waste item to be gripped and removed from a waste stream. The main tubular body 2 comprises a channel fluidly connecting the connecting end 3 and suction end 4, wherein the suction end 4 defines a suction opening O through which air and/or waste items can enter the suction head 1 toward the suction system S. The suction system S may be any type of system able to provide a vacuum or sufficiently low pressure to the suction head 1 and which is connectable to the connecting end 3 by means of e.g. a flexible hose H. In an exemplary embodiment, the main tubular body 2 may be substantially cylindrical and may be of a plastic or metal material depending on requirements. Typically, the main tubular body 2 is substantially rigid.

An upper sleeve or ring shaped member 5 and lower sleeve or ring shaped member 6 are arranged around the suction end 3, and where an annular gripper sheet or flap 7 of flexible material, and having an aperture 7a, is arranged between the upper and lower sleeve members 5, 6. The upper sleeve member 5 is longitudinally/lengthwise movable with respect to the main tubular body 2, e.g. the suction end 4, to allow clamping of the annular gripper sheet 7 between the upper and lower sleeve member 5, 6. The lower sleeve member 6 is removably arranged around the main tubular body 2, in particular the suction end 4 thereof. In an embodiment, the lower sleeve member 6 may be removably arranged through, for example, threaded engagement with the suction end 4 or a releasable snap-fit connection between the lower sleeve member 6 and the suction end 4.

It is noted that when referring to longitudinal/lengthwise movement and or directions that the terms "longitudinal" or "lengthwise" are associated with the direction L as depicted in FIGS. 1 and 2. Also, for clarity, the skilled person will readily understand that the terms "upper", "upward" and "lower", "downward" etc. are to be understood as referring to difference in positions and directions in vertical sense as the suction head 1 will typically be used in a vertical orientation as depicted in FIGS. 1 and 2, thus wherein the main tubular body 2 and a longitudinal axis thereof (parallel to "L") are substantially vertically positioned. Of course, the suction head 1 of the present invention may be used in horizontal or slanted fashion as well. Therefore, the upper sleeve/ring member 5 is to be seen as being "above" the lower sleeve/ring member 6, or wherein the lower sleeve/ring member 6 is to be seen as being "below" the upper sleeve/ring member 5 with respect to the orientation shown of the suction head 1.

The suction head 1 of the present invention further comprises a biasing member 8 in longitudinal biasing engagement, thus in the direction L, with the upper sleeve member 5 for biasing the upper sleeve member 5 toward the lower sleeve member 6, thereby clamping the annular gripper sheet 7 between the upper and lower sleeve member 5, 6.

According to the present invention, the clamped arrangement of the movable upper sleeve member 5, the removable lower sleeve member 6 and the annular gripper sheet 7 clamped there between provides for an extremely easy to assemble and dissemble suction head 1. For example, replacing the annular gripper sheet 7 is readily achieved by moving the upper sleeve member 5 in upward fashion against a biasing force imposed by the biasing member 8. Doing so loosens the annular gripper sheet 7 and allows the lower sleeve member 6 to be removed followed by the removal of the annular gripper sheet 7. The assembly process of the suction head 1 is just the reverse, moving the upper sleeve member 6 in upward direction against the biasing member 8, placing the annular gripper sheet 7 followed by attaching the lower sleeve member 6 to the suction end 4. Letting go of the upper sleeve member 5 will then allow the biasing member 8 to move, in downward fashion, the upper sleeve member 5 toward the lower sleeve member 6 as a result of which the annular gripper sheet 7 is clamped there between.

Another advantageous property of the suction head 1 is that the above exemplified assembly and disassembly process can be performed manually without tools and having to loosen or tighten bolts, nuts, or having to deal with any other conventional fasteners, clip rings, washers etc. So should the suction head 1 being clogged with a waste item, or the annular gripper sheet 7 requires repair or replacement, then service and maintenance of the suction head 1 can be performed very quickly in manual fashion. The suction head 1 of the present invention thus ensures that a waste sorting/processing system is most productive with minimal interruption.

As a separate stock item, in an embodiment the annular gripper sheet 7 may be a substantially flat annular sheet/flap of flexible material, or a flat piece of flexible sheet provided with the aperture 7a. In an embodiment, an outer circumference "Cs" of the annular gripper sheet 7 need not be circular as shown but could also be square, rectangular when required. However, in an exemplary embodiment, the annular gripper sheet 7 comprises a circular outer circumference Cs. In a further exemplary embodiment the aperture 7a and the circular outer circumference Cs may be concentric. As the skilled person will appreciate, the circumferential size such as an outer diameter of the annular gripper sheet 7 can be chosen based on the various types, sizes, weights and surface textures of waste items to grip.

In an embodiment, the annular gripper sheet 7 comprises elastomeric material, to provide a durable yet flexible annular gripper sheet 7. In an embodiment, the elastomeric material may rubber, silicone, EPDM or a combination thereof.

In an advantageous embodiment, the lower sleeve member 6 is configured to deform the annular gripper sheet 7 into a conical shape (in downward fashion) when in clamped engagement therewith, so that the annular gripper sheet 7 is able to engage a waste item with improved air tightness and wherein air leakage is minimized.

For example, in an embodiment, the lower sleeve member 6 comprises a circumferential upward facing bevelled edge 9 for clamping engagement with the flexible annular gripper sheet 7. In particular, the circumferential upward bevelled edge 9 allows the annular gripper sheet 7 to attain a substantially conic shape (in downward fashion) such that a circumferential edge E of the annular gripper sheet 7 has a much higher chance of engaging a waste item with minimum air leakage during strong suction. The term "upward facing bevelled edge" is to be considered in light of the depicted orientation of the suction head 1. That is, a circumferential upward facing bevelled or slanted edge 9 is shown in "upward" direction, e.g. in the direction of the connecting end 3. The circumferential upward facing bevelled edge 9 has the effect that, when the annular gripper sheet 7 is in clamping engagement with the lower sleeve member 6 as the upper sleeve member 5 pushes downward on annular gripper sheet 7, then the circumferential upward facing bevelled edge 9 forces the flexible annular gripper sheet 7 to follow the bevelled edge 9 such that a substantially conic shape is imposed on the annular gripper sheet 7. As such, the circumferential upward facing bevelled edge 9 may likewise be considered to be a circumferential upward facing conic edge 9 which shapes the annular gripper sheet 7 when the upper and slower sleeve members 5, 6, clamp the annular gripper sheet 7.

Figure 3:
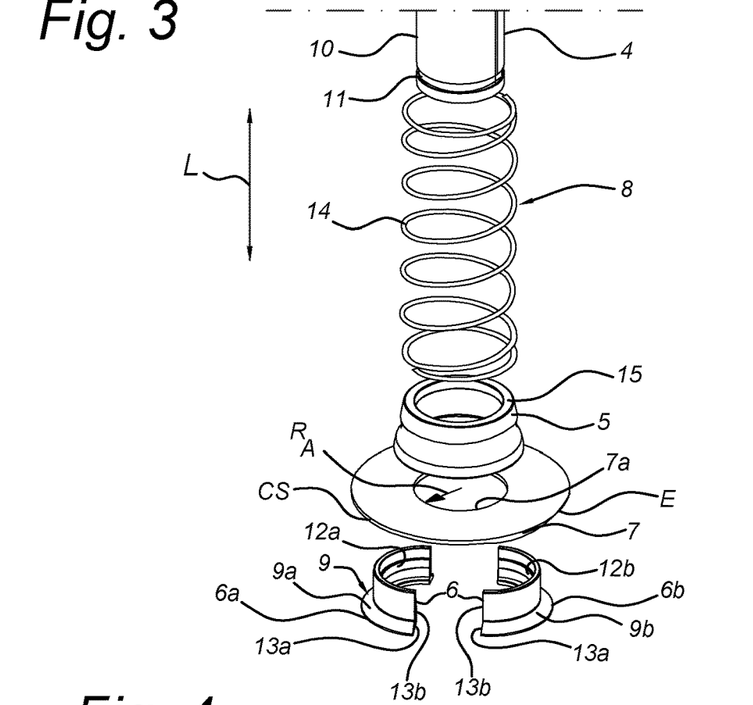
FIG. 3 shows a detailed view of a suction end of a suction head according to an embodiment of the present invention.

Further details of the suction end 4 of the suction head 1 can be found in FIG. 3, showing a detailed view of a suction end 4 of a suction head 1 according to an embodiment of the present invention. In the embodiment shown, the lower sleeve member 6 is formed by two semi-circular sleeve parts or shells 6a, 6b, wherein each semi-circular sleeve part/shell 6a, 6b comprises a circumferential upward facing bevelled edge portion 9a, 9b of the circumferential upward facing bevelled edge 9. In this embodiment, removability of the lower sleeve member 6 is achieved through two semi-circular sleeve parts or shells 6a, 6b each of which wrap in part around the suction end 4 in removable fashion, wherein each of the semi-circular sleeve parts 6a, 6b can be placed and removed in lateral direction with respect to the suction end 4, in a substantially perpendicular direction to the longitudinal direction L as shown. Once placed, the circumferential upward facing bevelled edge portions 9a, 9b together form the circumferential upward facing bevelled edge 9 for clamping engagement with the annular gripper sheet 7.

In an embodiment, the suction end 4 of the main tubular body 2 comprises an outer surface 10 provided with a circumferential groove 11, wherein each semi-circular sleeve part/shell 6a, 6b comprises an inwardly extending circumferential ridge 12a, 12b which is receivable in the groove 11 of the suction end 4. Therefore, the groove 11 and the inwardly extending circumferential ridges 12a, 12b are so shaped to engage and interlock in conformal fashion such that longitudinal movement of each of the semi-circular sleeve part/shell 6a, 6b is prevented. This allows the upper sleeve member 5 to press against the annular gripper sheet 7 whilst the lower sleeve member 5 is locked in longitudinal direction for clamping the annular gripper sheet 7.

In an embodiment, each of the semi-circular sleeve parts/shells 6a, 6b comprises a lower sleeve portion 13a comprising the circumferential upward facing bevelled edge portion 9a, 9b, and an upper sleeve portion 13b which is receivable in the upper sleeve member 5. In this embodiment the upper sleeve portion 13b of each semi-circular sleeve part/shell 6a, 6b can be inserted into the upper sleeve member 5 and radially enclosed thereby, so that the upper sleeve member 5 surrounds in part the lower sleeve member 6. In this way the upper sleeve member 5 acts as a retainer configured to prevent separation of the semi-circular sleeve parts/shell 6a, 6b from the suction end 4. The upper sleeve member 5 thus allows the groove 11 and the inwardly extending circumferential ridges 12a, 12b to remain engaged and prevent longitudinal movement of the lower sleeve member 6 as the biasing member 8 biases the upper sleeve member 5 toward the lower sleeve member 6.

To ensure that the annular gripper sheet 7 is able to firmly engage the circumferential upward facing bevelled edge 9, an embodiment is provided wherein the annular gripper sheet 7 comprises an aperture 7a in which the upper sleeve portion 13b of each semi-circular sleeve part 6a, 6b is receivable. That is, by allowing each upper sleeve portion 13b to extend through the aperture 7a of the annular gripper sheet 7 causes alignment of the annular gripper sheet 7 around the lower sleeve member 6. In an exemplary embodiment, an aperture radius Ra of the aperture 7a is equal or larger than an outer radius of the upper sleeve portion 13b of each semi-circular sleeve part 6a, 6b. Preferably, in an embodiment the aperture 7a comprises an aperture radius Ra that attains a tight fit of the annular gripper sheet 7 around the upper sleeve portion 13b of each semi-circular sleeve part 6a, 6b. This allows the annular gripper sheet 7 to firmly engage and overlap the circumferential upward facing bevelled edge portions 9a, 9b of each semi-circular sleeve part 6a, 6b.

The biasing member 8 for biasing the upper sleeve member 5 toward the lower sleeve member 6 can be embodied in various advantageous ways. For example, the biasing member 8 may be a coil spring member 14 arranged around the main tubular body 2 and in longitudinal biasing engagement with the upper sleeve member 5. The coil spring member 14 in this embodiment naturally provides a biasing force in longitudinal direction on the upper sleeve member 5, wherein the main tubular body 2 prevents buckling of the coil spring member 14. As shown, in an exemplary embodiment the coil spring member 14 is in biasing engagement with a circumferential upper edge portion 15 of the upper sleeve member 5, so that the upper sleeve member 5 experiences a circumferentially distributed biasing force minimizing tilting of the upper sleeve member 5.

Figure 4:
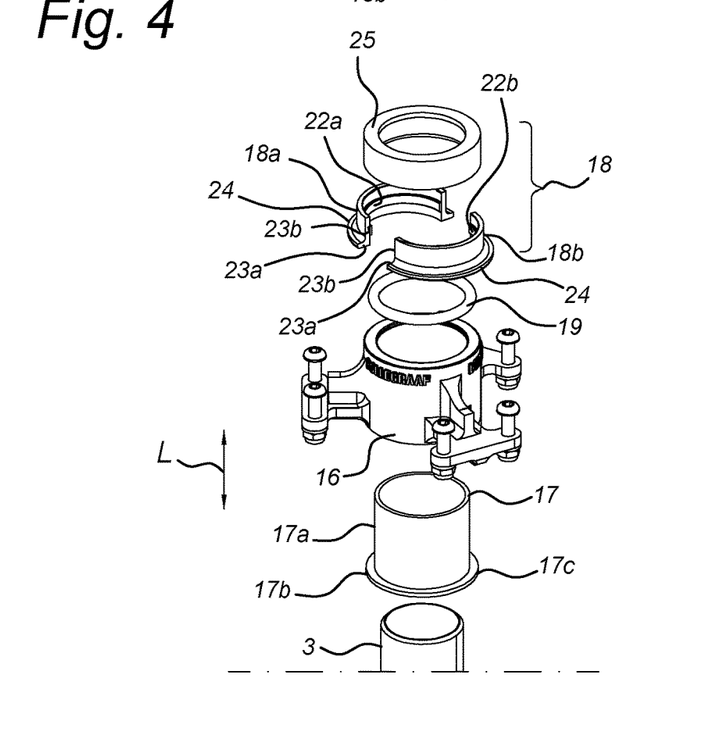
FIG. 4 shows a detailed view of a connecting end of a suction head according to an embodiment of the present invention.

Turning to the connecting end 3 of the suction head 1, FIG. 4 shows a detailed view of a connecting end 3 of a suction head 1 according to an embodiment of the present invention. In the embodiment shown, the suction head 1 may further comprise a connector sleeve or ring shaped member 16 for connection to a robot manipulator R or robot arm unit R, see FIG. 1. The connector sleeve member 16 is arranged around the connecting end 3 of the main tubular body 2 and longitudinally moveable, thus in the direction L, with respect to the main tubular body 2. The biasing member 8 is in longitudinal biasing engagement with the connector sleeve member 16, see FIG. 2.

The suction head 1 of the present invention can be connected to a robot manipulator using the connecter sleeve member 16 for moving the suction head 1 over, for example, a conveyor belt covered with waste items to be sorted. Furthermore, as the connector sleeve member 16 is longitudinally moveable with respect to the main tubular body 2, the suction end 4 can be placed firmly on a waste item and pressed thereon whilst allowing the connector sleeve member 16 to move downward along the main tubular body 2 and against the biasing force provided by the biasing member 8. Such longitudinal movement of the connector sleeve member 16 allows waste items of different sizes, e.g. heights, to be engaged by the suction end 4 with a desired force without overloading the robot manipulator as it pushes the suction end 4 on the waste item.

The height H of the main tubular body 2 can be chosen so that waste items within a particular size, e.g. height, range can be firmly pressed. Increasing the height H of the main tubular body 2 or making it taller, allows larger waste items to be engaged by the suction head 1 whilst still allowing the connector sleeve member 16 to move along the main tubular body 2 in a direction of the upper sleeve member 5 as the suction end 4 presses on a waste item.

Note that in an embodiment the biasing member 8, e.g. the coil spring member 14, may be in simultaneous biasing engagement with the upper sleeve member 5 and the connector sleeve member 16, imposing opposite but equal biasing forces on the upper sleeve member 5 and the connector sleeve member 16.

In an embodiment, the suction head 1 may further comprise an inner connector sleeve or ring shaped member 17 comprising an upper inner sleeve portion 17a which is receivable in the connector sleeve member 16 and a lower inner sleeve portion 17b provided with a circumferential outward protruding collar 17c for engagement with the biasing member 8. Here, the inner connecter sleeve member 17 may improve longitudinal movement of the connector sleeve member 16 through reduced friction offered by the upper inner sleeve portion 17a whilst the outward protruding collar 17c provides an abutment/contact area for the biasing member 8. For example, in case the biasing member 8 is a coil spring member 14, then the coil spring member 14 may abut/contact the outward protruding collar 17c. From FIG. 2 it follows that in a further embodiment the coil spring member 14 may be in simultaneous biasing engagement with the outward protruding collar 17c of the inner connecter sleeve member 17 and the circumferential upper edge portion 15 of the upper sleeve member 5. As a result, opposite but equal biasing forces are imposed on the connector sleeve member 16 and the upper sleeve member 5.

With further reference to FIG. 4 and FIG. 2, in an embodiment the suction head 1 further comprises a locking sleeve/ring member 18 which is arranged around the connecting end 3 of the main tubular body 2 and releasably connected to the connecting end 3, wherein the connector sleeve member 16 is arranged between the upper sleeve member 5 and the locking sleeve member 18. In this embodiment the locking sleeve member 18 provides a removable backstop for the connector sleeve member 16 as the biasing member 8 is in upward biasing engagement with the connector sleeve member 16. The removable locking sleeve member 18 further simplifies assembly and disassembly of the suction head 1 should servicing be required.

When the connector sleeve member 16 is attached to a robot manipulator, then longitudinal movements of the connector sleeve member 16 along the main tubular body 2 may be quite violent when the suction head 1 engages a waste item with considerable speed and force to ensure proper engagement of the annular gripper sheet 7 with the waste item. Then to prevent damaging the suction head 1 due to rapid upward movement of the connector sleeve member 6 against the locking sleeve member 18, an embodiment is provided wherein a resilient ring member 19 is arranged around the connecting end 3 between the connecter sleeve member 16 and the locking sleeve member 18. The resilient ring member 19 allows impact energy to be absorbed when the connector sleeve member 16 moves upward hitting the resilient ring member 19, which is then blocked from moving in upward longitudinal direction by the locking sleeve member 18. In an exemplary embodiment, the resilient ring member 19 may be of elastomeric material, e.g. rubber, thereby providing adequate resiliency and shock absorption.

In an embodiment, see FIGS. 2 and 4, the connecting end 3 of the main tubular body 2 may further comprise an outer surface 20 provided with a circumferential groove 21, and wherein the locking sleeve member 18 comprises two semi-circular locking sleeve parts or shells 18a, 18b each of which comprises an inwardly extending circumferential ridge 22a, 22b which is receivable in the groove 21 of the connecting end 3. The groove 21 in the outer surface 20 of the connecting end 3, and the inwardly extending circumferential ridges 22a, 22b of the two semi-circular locking sleeve parts 18a, 18b, are shaped to engage and interlock in conformal fashion such that longitudinal movement of each of the semi-circular locking sleeve parts 18a, 18b is prevented. Therefore, the two semi-circular locking sleeve parts 18a, 18b are removable in lateral direction with respect to the connecting end 3, e.g., in substantially perpendicular direction to the longitudinal direction L as shown. As such, the two the semi-circular locking sleeve parts 18a, 18b facilitate manual assembly and disassembly of the suction head 1.

In an embodiment, each of the semi-circular locking sleeve parts 18a, 18b comprises a lower locking sleeve portion 23a comprising a circumferential outward protruding collar 24 and an upper locking sleeve portion 23b, wherein the locking sleeve member 18 further comprises a retainer ring member 25 arranged around the connecting end 3. Further, the retainer ring member 25 is longitudinally moveable with respect to the connecting end 3, wherein the upper locking sleeve portion 23b of each semi-circular locking sleeve part 18a, 18b is receivable in the retainer ring member 25. The retainer ring member 25 is able to radially enclose the upper locking sleeve portion 23b of each semi-circular locking sleeve part 18a, 18b, so that the groove 21 in the outer surface 20 of the connecting end 3 and the inwardly extending circumferential ridges 22a, 22b of the two semi-circular locking sleeve parts 18a, 18b remain engaged and interlocked. This prevents longitudinal movement of the locking sleeve member 18 and as such provide a backstop for the connector sleeve member 16 to prevent further upward movement thereof.

Disassembly of the locking sleeve member 18 is surprisingly straightforward and achieved by moving the retainer ring member 25 in upward longitudinal fashion to expose the upper locking sleeve portions 23b of each semi-circular locking sleeve part 18a, 18b. Once exposed, the semi-circular locking sleeve parts 18a, 18b can be separated in lateral direction from the connecting end 3. No tools are required and the use of conventional fasteners is circumvented to optimize serviceability of the suction head 1.

In view of the above detailed description of the figures, the present invention can now be summarized by the following embodiments:

Embodiment 1

A suction head (1) for a waste sorting system, comprising a main tubular body (2) having a connecting end (3) for connection to a suction system (S) and a suction end (4) for engagement with a waste item;

an upper sleeve member (5) and a lower sleeve member (6) arranged around the suction end (4), wherein the upper sleeve member (5) is longitudinally movable with respect to the main tubular body (2) and wherein the lower sleeve member 6 is removable from the suction end (4);

an annular gripper sheet (7) of flexible material arranged between the upper and lower sleeve member (5, 6); and a biasing member (8) in longitudinal biasing engagement with the upper sleeve member (5) for biasing the upper sleeve member (5) toward the lower sleeve member (6) and clamping the annular gripper sheet (7) between the upper and lower sleeve member (5, 6).

Embodiment 2

The suction head (1) according to embodiment 1, wherein the lower sleeve member (6) comprises a circumferential upward facing bevelled edge (9) for clamping engagement with the annular gripper sheet (7);

Embodiment 3

The suction head (1) according to embodiment 2, wherein the lower sleeve member (6) is formed by two semi-circular sleeve parts (6a, 6b), each semi-circular sleeve part (6a, 6b) comprising a circumferential upward facing bevelled edge portion (9a, 9b) of the circumferential upward facing bevelled edge (9).

Embodiment 4

The suction head (1) according to embodiment 3, wherein the suction end (4) of the main tubular body (2) comprises an outer surface (10) provided with a circumferential groove (11), and wherein each semi-circular sleeve part (6a, 6b) comprises an inwardly extending circumferential ridge (12a, 12b) receivable in the groove (11) of the suction end (4).

Embodiment 5

The suction head (1) according to embodiment 3 or 4, wherein each of the semi-circular sleeve parts (6a, 6b) comprises a lower sleeve portion (13a) comprising the circumferential upward facing bevelled edge portion (9a, 9b), and an upper sleeve portion (13b) being receivable in the upper sleeve member (5).

Embodiment 6

The suction head (1) according to embodiment 5, wherein the annular gripper sheet (7) comprises an aperture (7a) in which the upper sleeve portion (13b) of each semi-circular sleeve part (6a, 6b) are receivable.

Embodiment 7

The suction head (1) according to any one of embodiments 1-6, wherein the biasing member (8) is a coil spring member (14) arranged around the main tubular body (2) in longitudinal biasing engagement with the upper sleeve member (5).

Embodiment 8

The suction head (1) according to embodiment 7, wherein the coil spring member (14) is in biasing engagement with a circumferential upper edge portion (15) of the upper sleeve member (5).

Embodiment 9

The suction head (1) according to any one of embodiments 1-8, further comprising a connector sleeve member (16) for connection to a robot manipulator and wherein the connector sleeve member (16) is arranged around the connecting end (3) of the main tubular body (2) and longitudinally moveable with respect thereto, wherein the biasing member (8) is in longitudinal biasing engagement with the connector sleeve member (16).

Embodiment 10

The suction head (1) according to embodiment 9, further comprising an inner connector sleeve member 17 comprising an upper inner sleeve portion (17a) receivable in the connector sleeve member (16) and a lower inner sleeve portion (17b) provided with a circumferential outward protruding collar (17c) for engagement with the biasing member (8).

Embodiment 11

The suction head (1) according to embodiment 9 or 10, further comprising a locking sleeve member (18) arranged around the connecting end (3) of the main tubular body (2) and releasably connected to the connecting end (3), wherein the connector sleeve member (16) is arranged between the upper sleeve member (5) and the locking sleeve member (18).

Embodiment 12

The suction head (1) according to embodiment 11, further comprising a resilient ring member (19) arranged around the connecting end (3) between the connecter sleeve member (16) and the locking sleeve member (18).

Embodiment 13

The suction head (1) according to embodiment 11 or 12, wherein the connecting end (3) of the main tubular body (2) comprises an outer surface (20) provided with a circumferential groove (21), and wherein the locking sleeve member (18) comprises two semi-circular locking sleeve parts (18a, 18b) each of which comprises an inwardly extending circumferential ridge (22a, 22b) receivable in the groove (21) of the connecting end (3).

Embodiment 14

The suction head (1) according to embodiment 13, wherein each of the semi-circular locking sleeve parts (18a, 18b) comprises a lower locking sleeve portion (23a) comprising a circumferential outward protruding collar (24) and an upper locking sleeve portion (23b), wherein the locking sleeve member (18) further comprises a retainer ring member (25) arranged around the connecting end (3) and longitudinally moveable with respect thereto, and wherein the upper locking sleeve portion (23b) of each semi-circular locking sleeve part (18a, 18b) is receivable in the retainer ring member (25).

Embodiment 15

The suction head (1) according to any one of embodiments 1-14, wherein the annular gripper sheet (7) comprises elastomeric material.

Embodiment 16

The suction head (1) according to embodiment 15, wherein the elastomeric material is rubber, silicone, EPDM or a combination thereof.

The present invention has been described above with reference to a number of exemplary embodiments as shown in the drawings. Modifications and alternative implementations of some parts or elements are possible, and are included in the scope of protection as defined in the appended claims.

The invention claimed is:

1. A suction head for a waste sorting system, comprising a main tubular body having a connecting end for connection to a suction system and a suction end for engagement with a waste item;
   an upper sleeve member and a lower sleeve member arranged around the suction end, wherein the upper sleeve member is longitudinally movable with respect to the main tubular body and wherein the lower sleeve member is removably connected to the suction end of the main tubular body;
   an annular gripper sheet of flexible material arranged between the upper and lower sleeve member; and
   a biasing member in longitudinal biasing engagement with the upper sleeve member for biasing the upper sleeve member toward the lower sleeve member and clamping the annular gripper sheet between the upper and lower sleeve member.

2. The suction head according to claim 1, wherein the lower sleeve member comprises a circumferential upward facing bevelled edge for clamping engagement with the annular gripper sheet.

3. The suction head according to claim 2, wherein the lower sleeve member is formed by two semi-circular sleeve parts, each semi-circular sleeve part comprising a circumferential upward facing bevelled edge portion of the circumferential upward facing bevelled edge.

4. The suction head according to claim 3, wherein the suction end of the main tubular body comprises an outer surface provided with a circumferential groove, and wherein each semi-circular sleeve part comprises an inwardly extending circumferential ridge receivable in the groove of the suction end.

5. The suction head according to claim 3, wherein each of the semi-circular sleeve parts comprises a lower sleeve portion comprising the circumferential upward facing bevelled edge portion, and an upper sleeve portion being receivable in the upper sleeve member.

6. The suction head according to claim 5, wherein the annular gripper sheet comprises an aperture in which the upper sleeve portion of each semi-circular sleeve part are receivable.

7. The suction head according to claim 1, wherein the biasing member is a coil spring member arranged around the main tubular body in longitudinal biasing engagement with the upper sleeve member.

8. The suction head according to claim 7, wherein the coil spring member is in biasing engagement with a circumferential upper edge portion of the upper sleeve member.

9. The suction head according to claim 1, further comprising a connector sleeve member for connection to a robot manipulator and wherein the connector sleeve member is arranged around the connecting end of the main tubular body and longitudinally moveable with respect thereto, wherein the biasing member is in longitudinal biasing engagement with the connector sleeve member.

10. The suction head according to claim 9, further comprising an inner connector sleeve member 17 comprising an upper inner sleeve portion receivable in the connector sleeve member and a lower inner sleeve portion provided with a circumferential outward protruding collar for engagement with the biasing member.

11. The suction head according to claim 9, further comprising a locking sleeve member arranged around the connecting end of the main tubular body and releasably connected to the connecting end, wherein the connector sleeve member is arranged between the upper sleeve member and the locking sleeve member.

12. The suction head according to claim 11, further comprising a resilient ring member arranged around the connecting end between the connecter sleeve member and the locking sleeve member.

13. The suction head according to claim 11, wherein the connecting end of the main tubular body comprises an outer surface provided with a circumferential groove, and wherein the locking sleeve member comprises two semi-circular locking sleeve parts each of which comprises an inwardly extending circumferential ridge receivable in the groove of the connecting end.

14. The suction head according to claim 13, wherein each of the semi-circular locking sleeve parts comprises a lower locking sleeve portion comprising a circumferential outward protruding collar and an upper locking sleeve portion, wherein the locking sleeve member further comprises a retainer ring member arranged around the connecting end and longitudinally moveable with respect thereto, and wherein the upper locking sleeve portion of each semi-circular locking sleeve part is receivable in the retainer ring member.

15. The suction head according claim 1, wherein the annular gripper sheet comprises elastomeric material.

16. The suction head according to claim 15, wherein the elastomeric material is rubber, silicone, EPDM or a combination thereof.

* * * * *